US005897775A

United States Patent [19]

Kihlström

[11] Patent Number: 5,897,775
[45] Date of Patent: Apr. 27, 1999

[54] HOPPER HAVING LIQUID PERMEABLE SIDEWALLS AND VACUUM MEANS TO DE-WATER AND REMOVE WASTE

[75] Inventor: Christer Kihlström, Skara, Sweden

[73] Assignee: Centralsug SVS AB, Sweden

[21] Appl. No.: 08/737,150

[22] PCT Filed: May 4, 1995

[86] PCT No.: PCT/SE95/00489

§ 371 Date: Jan. 3, 1997

§ 102(e) Date: Jan. 3, 1997

[87] PCT Pub. No.: WO95/30609

PCT Pub. Date: Nov. 16, 1995

[30] Foreign Application Priority Data

May 4, 1994 [SE] Sweden .................................. 9401529

[51] Int. Cl.[6] ...................................................... B01D 29/88

[52] U.S. Cl. ....................... 210/406; 210/416.1; 209/246; 209/910

[58] Field of Search ................................... 210/406, 407, 210/416.1; 209/244, 246, 910

[56] References Cited

U.S. PATENT DOCUMENTS

| | | | |
|---|---|---|---|
| 744,390 | 11/1903 | Osborne et al. . | |
| 788,219 | 4/1905 | Ogle . | |
| 3,794,164 | 2/1974 | Ginaven | 209/243 |
| 4,085,040 | 4/1978 | Egan | 210/456 |
| 4,648,432 | 3/1987 | Mechalas | 141/68 |
| 4,715,957 | 12/1987 | Cogan et al. | 210/497.3 |
| 4,748,905 | 6/1988 | Langdon . | |
| 5,120,161 | 6/1992 | Faussone . | |
| 5,355,789 | 10/1994 | Suzuki et al. . | |
| 5,470,473 | 11/1995 | Park et al. | 210/406 |
| 5,589,079 | 12/1996 | Park et al. | 210/406 |

FOREIGN PATENT DOCUMENTS

| | | |
|---|---|---|
| 7304760 | 10/1973 | Sweden . |
| 75140145 | 6/1976 | Sweden . |
| 1342097 | 12/1973 | United Kingdom . |

OTHER PUBLICATIONS

Abstract of GB 16 141, 1910, (Dassy, F.), column 2, line 12–line 19, see detail 6 in combination with a vacuumpump.

*Primary Examiner*—Robert Popovics
*Attorney, Agent, or Firm*—Ostrolenk, Faber, Gerb & Soffen, LLP

[57] ABSTRACT

Vacuum accumulator incorporating a vacuum vessel for communication with a suction conduit, and with at least one vacuum accumulator vessel interconnectable with the vacuum vessel via a stop valve, in turn connected to a vacuum pump for charging of said vessels with a vacuum under a limited volume, whereby the stop valve is adapted to open when the vacuum in the vacuum vessel drops to a certain volume. A device for dewatering and removal of waste by vacuum, with a track intended for supply of the waste and incorporating a collecting hopper narrowing in a direction from above and downwards and having a closed bottom portion, at which is arranged the opening of a suction conduit connectable to a vacuum source for applying a vacuum in the bottom portion of the collecting hopper. At a distance above the bottom portion of the collecting hopper is pivotably supported a plate, which in a substantially horizontal pivoting position is adapted to cover substantially the entire cross section of the collecting hopper, whereas under the upraised pivoting position, it is adapted temporarily to expose a larger part of said cross section for allowing down feed of waste into the bottom portion of the collecting hopper. A vacuum pump intermittently applies vacuum in the bottom portion of the collecting hopper when the pivotably supported plate is in its substantially horizontal pivoting position.

8 Claims, 3 Drawing Sheets

HOPPER HAVING LIQUID PERMEABLE SIDEWALLS AND VACUUM MEANS TO DE-WATER AND REMOVE WASTE

BACKGROUND OF THE INVENTION

The present invention refers to waste treatment by aid of suction. At transport of waste of different kinds with aid of suction it is often used continuous suction, which certainly means a very large energy consumption, and which also means a need for big and expensive vacuum pumps. For intermittent transport it however also is required rather large and therefore expensive vacuum vessels and vacuum pumps, as the suction must be maintained during a time of several seconds, which means a need for a rather big volume of vacuum.

SUMMARY OF THE INVENTION

Primarily the invention refers to a vacuum accumulator by aid of which the size and capacity of required vacuum pumps and tanks can be reduced to a substantial degree with maintained extended suction time.

The invention furthermore includes a device intended for dewatering and removal of waste, e.g. food waste, produced in large-scale kitchens, in catering industry and the like and which device is connected e.g. in waste handling and/or waste sorting plants of different types and where the transport at least partly is carried out by aid of vacuum, e.g. created by aid of a vacuum accumulator according to the invention.

Hereinafter the invention will be further described with reference to an illustratory embodiment shown in the accompanying drawings.

DETAILED DESCRIPTION OF THE PREFERRED EMBODIMENTS

Figure 1:
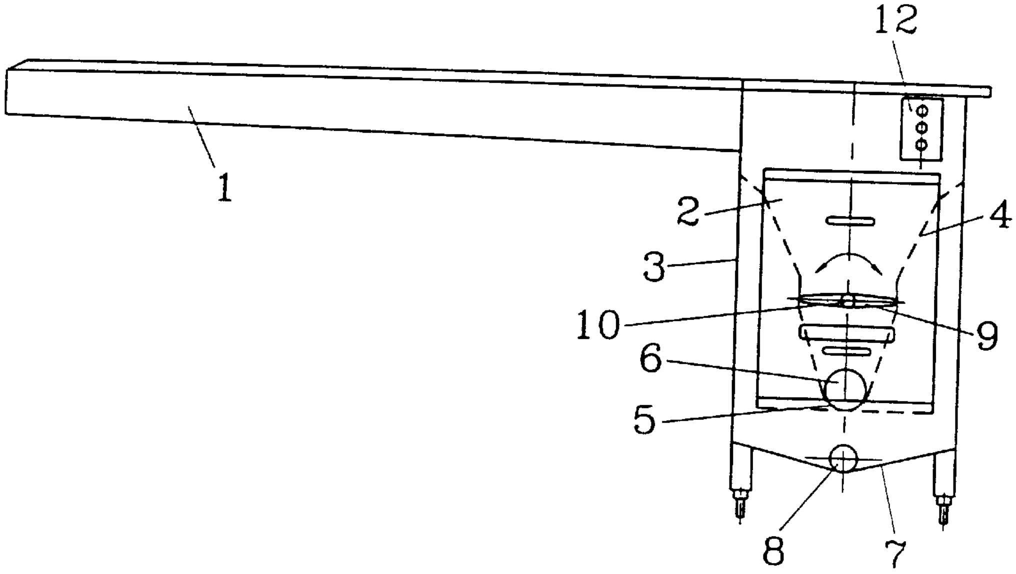
FIG. 1 shows in a side view, and for the sake of clarity partly with hidden contours shown with dash lines, a device according to the invention.

FIG. 1 shows in side view a device according to the invention incorporating a transport gutter 1, which can be constituted, e.g. by a conveyor or can be a portion thereof, and in which the material, primarily food waste, which shall be dewatered and transported away is supplied from the left hand side in the drawing. At the right hand side the gutter 1 opens in a collecting hopper 2, provided in a housing 3. The collecting hopper 2 has a cross section narrowing in a direction from above and downwards and its thus inclined walls 4 are wire walls, or walls otherwise designed for allowing liquid passage. At the lower part of the hopper 2 this is also provided with a bottom 5 which is liquid permeable and the interior portion above the bottom is connected to a duct 6, the function of which will be described in the following.

Figure 2:
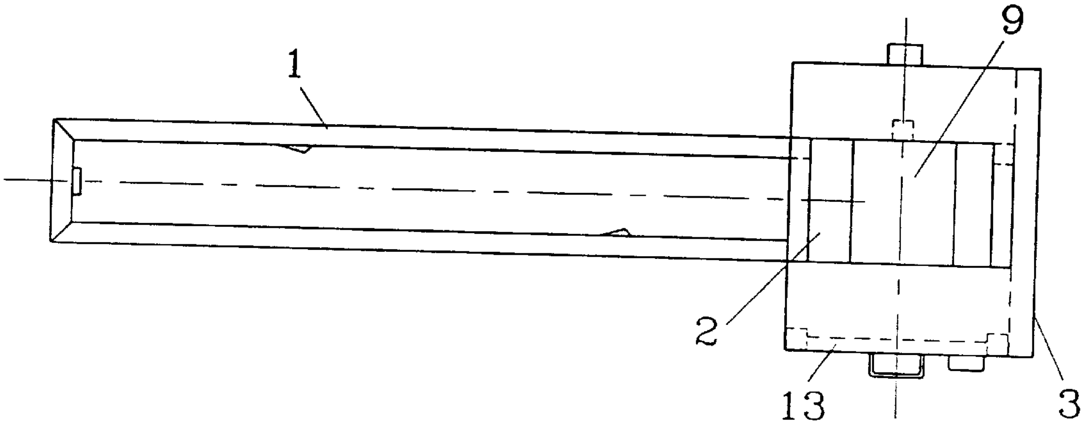
FIG. 2 is a view of the device according to FIG. 1 seen from above.
Figure 3:
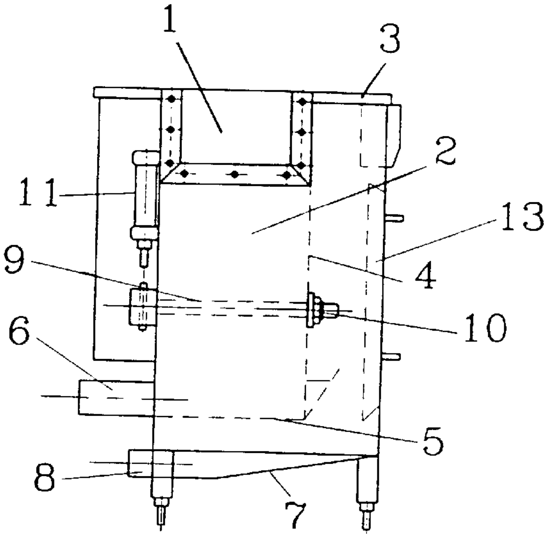
FIG. 3 shows in an end view from the left hand side the device according to FIG. 1.

The bottom 5 in the collecting hopper 2 is situated at a level above the lower wall 7 of the housing 3, which in the embodiment shown in FIGS. 1 to 3 slopes towards the centre and one side, where a conduit 8 is connected for discharging liquid, which has drained off from the material collected in the collection hopper and passed the liquid permeable walls 4 and bottom 5 of the collecting hopper.

At a distance above the bottom 5 of the collection hopper there is provided a plate 9 designed as a pivotable valve, with a substantially horizontal pivot shaft 10 supported in the walls of the collecting hopper. This plate 9, acting as a rotary valve, is dimensioned to cover, in its horizontal normal position, the cross section of the collecting hopper 2 and thereby prevent material fed down into the collecting hopper from reaching the bottom 5 of the hopper. In the embodiment shown the plate 9 is pivotable by influence of an actuator 11, e.g. an air cylinder, an electric rotary actuator, or the like. This actuator 11 can be adapted to initiate pivoting of the plate 9 at certain time intervals under governing from a control device not further shown, and/or can be manually brought to effect a pivoting of the plate 9 by actuation of a control 12. The housing 3 of the device at one side is provided with a removable cover 13 for making possible a simple rinsing and cleaning of the interior of the device.

The device according to FIGS. 1–3 operates in the following manner:

Trays or the like (which are not shown in the drawings), on which rest food waste, napkins and the like, are transported along the gutter 1 towards the housing 3. At the upper end of the collecting hopper the trays are emptied in appropriate manner, e.g. by not shown scrapers, by not shown rockers or the like, thus that the material on the trays is emptied into the collecting hopper 2. The plate 9 in its neutral position is in its substantially horizontal position, covering the cross section of the hopper and preventing the down-falling material from reaching the bottom 5 of the collecting hopper. In this position with the material resting on the plate 9, liquid in the material will flow out and be drained via the liquid permeable walls 4 of the hopper. This liquid flows down onto the lower wall 7 of the housing, where it is led away through the conduit 8. After a proper dwell time in relation to the volume of material supplied on this plate 9, the material collected thereon is brought to fall into the lower portion of the hopper in that the actuator 11 is activated either via the time control or manually, thus that the plate 9 is pivoted preferably 180°, and eventually to a substantially vertical position, whereby the material falls down into the space below the plate 9 in the hopper 2. At the pivoting through 180° or after return of the plate 9 to its position covering the cross section of the hopper, by influence of the actuator 11, further material can be gathered upon the plate 9. After a dwell time of e.g. 2 minutes for the material, which has fallen down below the plate 9, during which time further dewatering occurs, the duct 6 opening in the lower portion of the hopper is subjected to a suction effect, which is maintained during a certain time for sucking out the material in the space below the plate 9 to a not shown station for taking care of or treating the material, which thus has been dewatered.

With such a device and by means of such a method it is possible without problems to use an intermittent, application of vacuum during a short period of time in order to obtain a suction effect, having the ability to move away the collected and dewatered material. This of course means a substantially reduced need for suction effect, giving reduced costs regarding installation of suction sources and surrounding equipment as well as regarding operating costs. By proper setting of the interval between pivoting actuation of the plate 9 acting as a pivot valve and the duration of the suction applied it is furthermore achieved a highly problem-free handling of the material.

Figure 4:
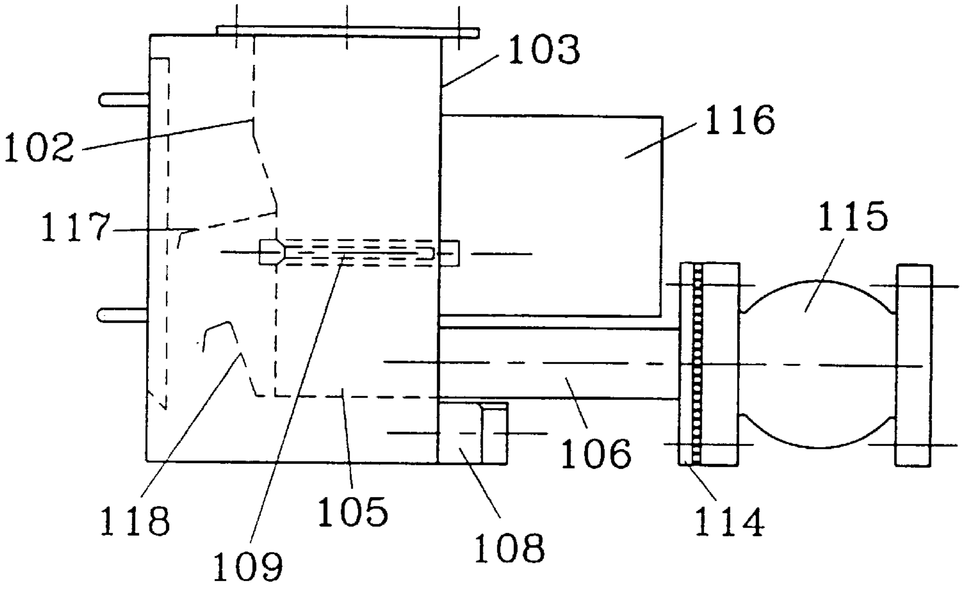
FIG. 4 is an end view in bigger scale seen from the opposite side as compared to FIG. 3 and with a vacuum conduit connected thereto.
Figure 5:
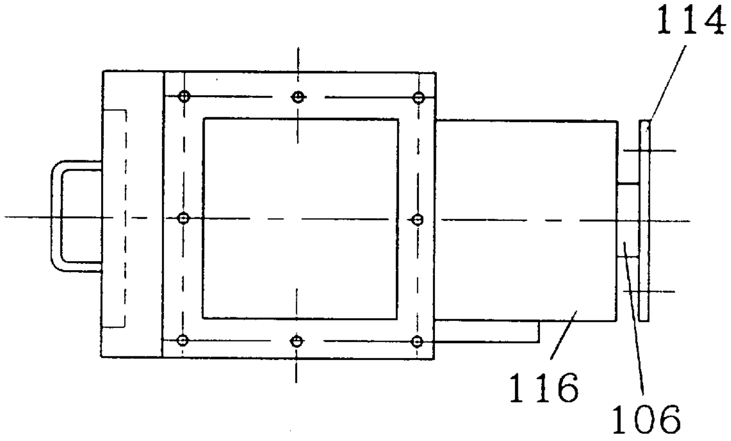
FIG. 5 shows the device shown in FIG. 4 in a view from above.
Figure 6:
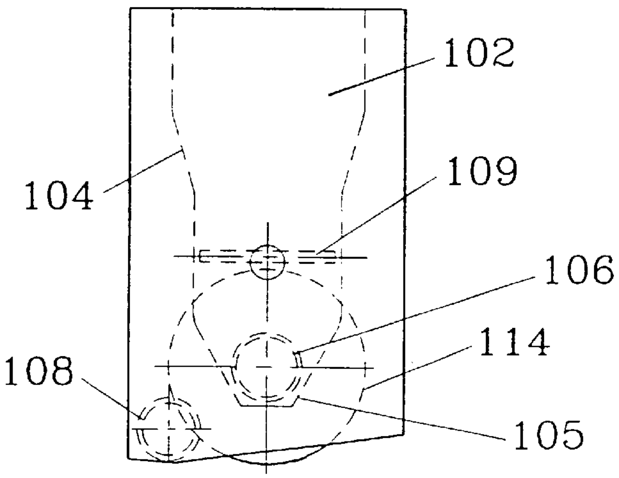
FIG. 6 is a side view of the device in FIG. 4, with hidden contours intimated in dash lines.

The embodiment of the device according to the invention, which is illustrated in FIGS. 4–6, differ only regarding details from the embodiment according to FIGS. 1 to 3. Thus in this embodiment the housing 103 has a collecting hopper 102 of somewhat different appearance, but this collecting hopper 102 in the same manner as the collecting hopper 2 according to the earlier described example, has liquid permeable walls 104 and an adjustable plate 109 as a pivot valve positioned at a distance above the bottom of the hopper. The conduit 106 for applying a vacuum in the space of the hopper below the plate 109 is provided with an external flange 114 for connection to a valve 115 forming part of the vacuum duct. In this embodiment there is furthermore a casing 116 connected to the housing 103, which casing encloses not further shown actuating means for pivoting the plate 109 and control means for time dependent control of the plate motion and application of the suction effect. As can be clearly seen in FIG. 4 guiding means 117, 118 are preferably provided in connection to the valve plate 109, in the space outside the collecting hopper 102, preferably in form of oblique panels, intended during the suction sequences in cooperation with the plate 9 to guide the flow of air through the chamber below the valve plate, thus that the air is brought to flow through this chamber from its side turned away from the opening of the suction conduit 106 directly towards the suction conduit 106 in order to facilitate removal of material gathered in the chamber.

Of course the suction conduit is connected to a whirler (not shown), a receiver or the like for separation of the goods transported from the air flow at an appropriate place.

Figure 7:
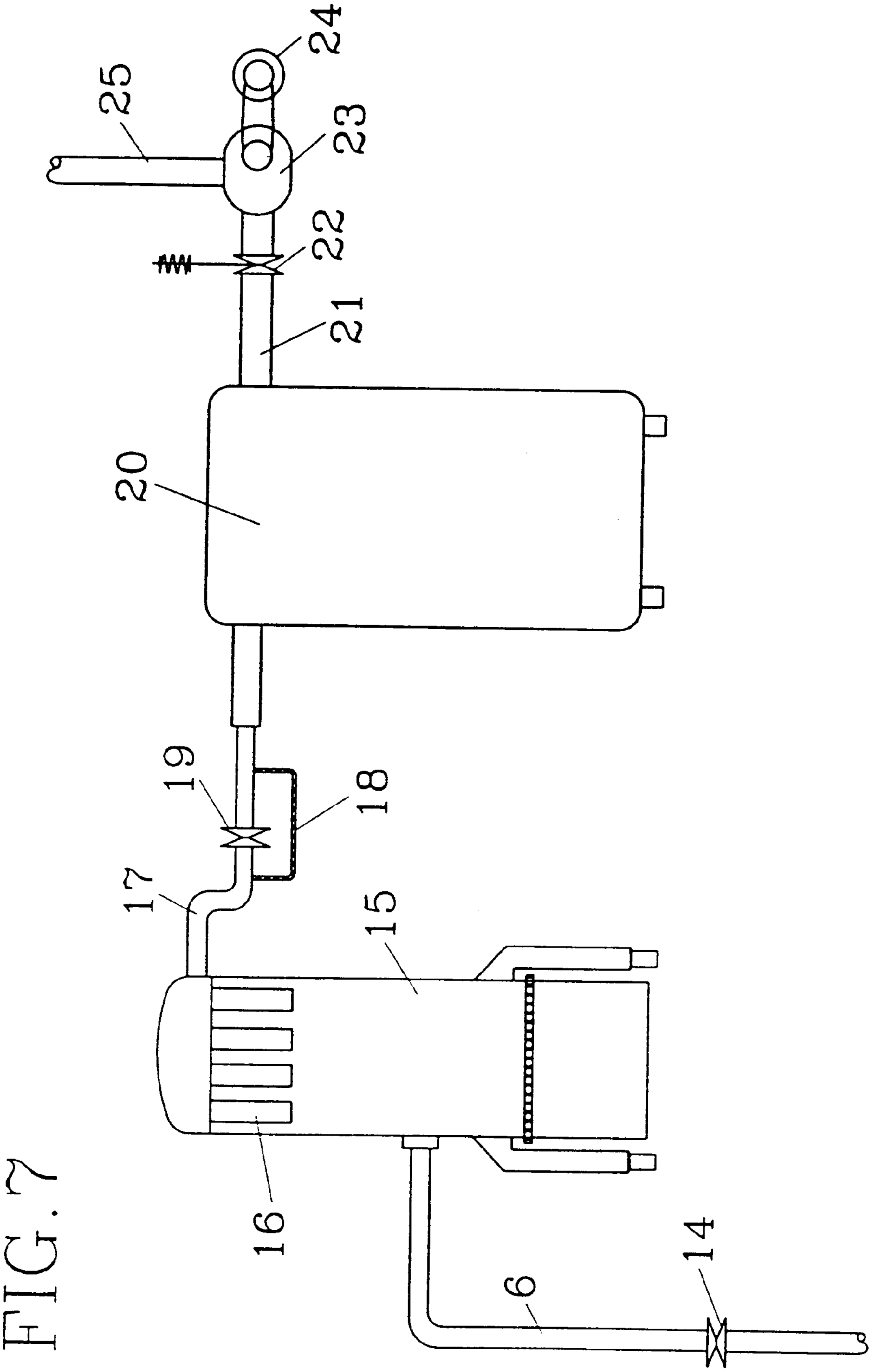
FIG. 7 illustrates schematically the design of a vacuum accumulator according to the invention.

In order further to increase the economy at a device according to FIGS. 1–3 and 4–6, respectively, the invention further provides a vacuum accumulator, which however can be used also for other purposes, where there is a desire to minimize operating and investment costs but still a need for a vacuum during a certain period of time, and which is diagrammatically illustrated in FIG. 7, and in which is arranged a suction duct 6 corresponding to the duct 6 opening in the lower space of the collecting hopper of FIG. 1. The duct 6 is preferably provided with a first stop valve 14. The duct is connected to a columnar vacuum container 15, which at the upper end is equipped with a number of filters/dewatering tubes 16, and has a tube line 17 extending from the top thereof. In this tube line 17 there is arranged a by-pass conduit 18 with a second stop valve 19 before the tube line 17 is connected to an accumulating vacuum vessel 20. The accumulator vessel 20 is further, via a conduit 21 having an adjustable valve 22 provided therein, connected to a vacuum pump 23 driven by a motor 24 and equipped with an outlet 25.

By means of such an arrangement it is possible to charge both vessels 15 and 20 with vacuum of e.g. 70–90%, with quite a small vacuum pump 23. At start of the rather short suction procedure required for the device according to the invention, the valve 19 is closed and the valve 14 is opened, whereby a short inflow of air through the duct 6 into the vacuum vessel 15 occurs, which gives a suction effect in the duct 6 and thereby in the space situated below the pivotable plate in the collecting chamber. Hereby the vacuum in the vacuum vessel 15 is continuously reduced. A proper through-flow of about 50–60 m/s for the intended application field can be set after the first jerk-like moment by proper dimensioning. When the vacuum in the vessel 15 has been reduced to a certain level, where the desired flow can not be maintained any longer, the valve 19 is opened, whereby the vacuum in the accumulator vessel 20 causes that the desired volume of flow, which is sufficient for maintaining transport of the goods, can be maintained a further period of time. The valve 19 thereby in a manner known per se is designed thus that its opening condition is dependent of the remaining vacuum in the accumulator vessel 20, i.e. as the vacuum in the vessel 20 drops the valve 19 is opened more and more. In this manner it is possible with comparatively inexpensive vessels and a vacuum pump of rather low capacity to obtain suction periods of about 10 seconds and more at the above-mentioned desired flow. In the shown sketchy design the device has been shown with a vacuum vessel 15 and an accumulator vessel 20, but it is of course possible to increase the suction capacity and performance by connecting more accumulator vessels in the system if so is required and desired.

The invention in its two main forms is not limited by the embodiments illustrated in the drawings and described in connection thereto but modifications and variations are possible within the scope of the appended claims.

I claim:

1. A device for dewatering and removing waste by means of vacuum, the device comprising:

a waste collecting hopper having liquid permeable sidewall, said hopper narrowing in cross-section from an open top into which waste to be dewatered enters to a closed bottom portion also having liquid permeable walls;

a plate pivotally supported in the hopper above the bottom portion having a substantially horizontal pivoting position at which the hopper and the plate are so shaped as to cause the plate to substantially cover the entire cross-section of the hopper, the plate being pivotable from the horizontal pivoting position temporarily to expose a larger portion of the cross-section of the hopper so that waste in the hopper above the plate may pass into the bottom portion of the hopper;

a vacuum source for intermittently applying vacuum in the bottom portion of the hopper, wherein the vacuum source is applied when the pivotally supported plate is in its substantially horizontal position;

a suction conduit opening into the bottom portion of the hopper, the suction conduit being connected to said vacuum source for applying vacuum in the bottom portion of the hopper.

2. The device of claim 1, further comprising actuating means which is either manually controlled or time controlled for pivoting the pivotally supported plate.

3. The-device of claim 1, further comprising a housing, the hopper being arranged in the housing, the housing having a lower bottom situated below the bottom portion of the collecting hopper.

4. The device of claim 3, wherein the lower bottom of the housing is sloping in orientation and has a lowest position thereof;

a liquid outlet conduit connected to the housing at the lowest position of the bottom for enabling removal of liquid from the housing.

5. The device of claim 1, further comprising a housing around the hopper in which the hopper is arranged and a chamber in the housing around the hopper;

guiding means for guiding airflow substantially through the chamber and below the plate toward the opening of the suction conduit in the hopper.

6. The device of claim 1, wherein the vacuum source comprises a vacuum vessel connected to the suction conduit;

at least one vacuum accumulator vessel connectable to the vacuum vessel;

a vacuum pump connected to the vacuum accumulator vessel and adapted to charge both of the vacuum vessel and the vacuum accumulator vessel with vacuum; and a stop valve between the vacuum vessel and the vacuum accumulator vessel, the stop valve being adapted to open when the vacuum in the vacuum in the vacuum vessel drops below a certain level.

7. A device of claim 6, further comprising a bypass conduit between the vacuum vessel and the vacuum accumulator vessel to bridge the stop valve.

8. The device of claim 1, further comprising a waste supply device for supplying waste to the top of the hopper.

* * * * *